Figure 1:
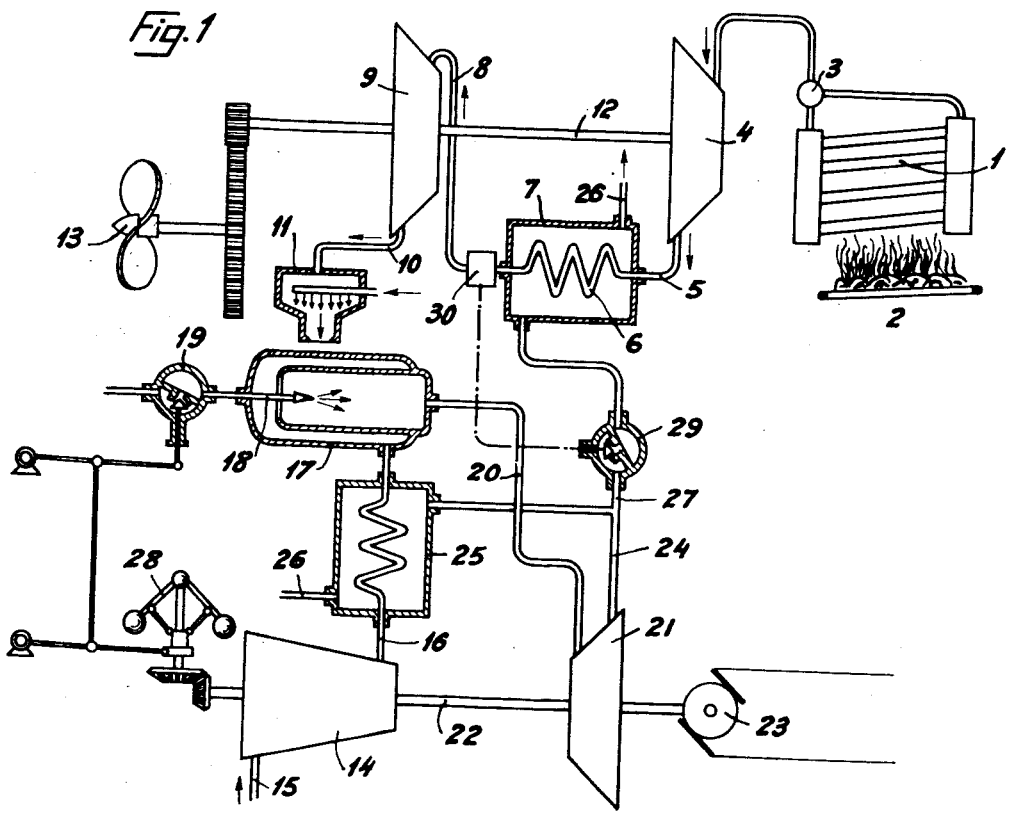

Dec. 22, 1953   R. G. LEGENDRE   2,663,146
COMBINED GAS AND STEAM POWER PLANT
Filed April 24, 1950

INVENTOR
Robert G. Legendre
By Watson, Cole, Grindle &
Watson
ATTYS

Patented Dec. 22, 1953

2,663,146

UNITED STATES PATENT OFFICE 2,663,146

COMBINED GAS AND STEAM POWER PLANT

Robert G. Legendre, Paris, France

Application April 24, 1950, Serial No. 157,682

Claims priority, application France April 26, 1946

4 Claims. (Cl. 60—39.18)

The present application is in part a continuation of my prior application Ser. No. 741,438, filed April 15, 1947, now abandoned.

In power plants of any type (whether with turbines or reciprocating engines) using steam as driving fluid and comprising several expansion stages in series through which steam flows, it is very convenient, as known, to reheat steam on its way between two consecutive expansion stages. However, the various reheating methods known nowadays—e. g. leading steam to be reheated back to a reheater embodied in the boiler, reheating by means of highly superheated live steam, using a re-superheater having its own furnace, separated from that of the boiler—entail complicated, unreliable and hardly workable dispositions, specially when the power absorbed or even the direction of rotation of the apparatus driven by the power plant (e. g. the screw of a ship) are liable to change during operation.

On the other hand, gas turbine power plants are well known and have involved numerous works for introducing them into the field of practice.

So-called explosion turbines have first been proposed which comprise up-stream the turbines, furnaces wherein a fuel and a combustive are periodically introduced and ignited. The gas exhausts from the furnaces through the nozzles of the turbines and performs work therein at a temperature, pressure and speed which vary during a period.

Such a turbine is the well known Holzwarth's turbine.

These turbines carry a drawback, namely fuel can only be properly burnt during explosion in the furnaces of these turbines, provided its percentage in the mixture is high. The maximum temperature and even the mean temperature are then considerable and the temperature of the exhaust gas of the turbines is still very high with respect to practical expansion ratios without prohibitive increase of the compression rate of combustive air.

For the above reasons, it has already been proposed to scavenge explosion chambers and nozzles with air and also to cool these chambers with water. It has also been proposed to recover heat energy contained in the exhaust gas for the purpose of heating water. This has lead to the design of explosion turbine plants in which steam is generated on the one hand through heat evolved in the explosion chambers, and on the other hand through heat recovered from the exhaust gas, the energy being resupplied to the shaft of the gas turbine by means of steam turbines driven by that steam and most often mechanically connected to the gas turbine, but whose powers are anyhow accurately bound to that of the gas turbine. These steam turbines may involve several stages in series, the steam which has performed work in one of the stages being reheated before reaching the following stages in a reheater managed in the exhaust gas circuit of the explosion turbine.

The above dispositions have proved inadequate, both for the purpose of limiting the waste of heat at the exhaust and of keeping the metal of the blades of the gas turbine at a reasonable temperature. It has then been proposed to complete the cooling of the gas by means of heat-exchangers inserted between the nozzles and the movable blading and even between the consecutive stages of the gas turbine. The heat exchangers are crossed by water at various steps of its evolution along the circuit of the steam plant, of which explosion turbine is no longer but an accessory. It may further be used in an auxiliary function with regards to the steam plant, provided its power be properly adapted to this function, whatever be the steam flow.

All these dispositions are but poor palliatives to the numerous drawbacks of the explosion turbine.

Constant pressure combustion gas turbines are also known in which air under pressure, discharged by a compressor, is heated ahead of the turbine through internal combustion of an appropriate fuel which is most often in the liquid state, the turbine thus receiving a continuous flow of hot gas.

In the simplest cycle of these constant pressure combustion gas turbines, excessive temperatures of gas at the intake of the turbine are avoided, providing the compressor to discharge more air than required for burning the fuel fed to the combustion chamber or furnace. Furthermore, the exhaust gas residual heat is recovered in a heat-exchanger wherein the exhaust gas heats air discharged by the compressor, before feeding this air to the combustion chambers. This cycle which is complete in itself has become conventional as regards this kind of engines.

It has been attempted to avoid the air excess in the furnaces or combustion chambers with a view to reduce the air-compressor power by removing from the hot gas a fraction of its heat for water vaporisation, the steam thus generated being used for driving a steam engine. In such plants which have also become conventional, the gas turbine is but an accessory of the steam plant like the explosion turbine of more recent design.

Numerous other combinations have been contemplated involving steam and gas turbines forming a single driving engine whose operation reliability is only achieved through complicated regulation. In such combinations, it is practically impossible to alter independently, and within a wide range, the powers of the steam turbines and of the gas turbines, while protecting the heat exchangers against excessive temperatures, specially during the steam flow shutting off periods which may be necessary when the direction of rotation of the power absorbing apparatus driven by the steam turbine, is to be reversed.

The present invention differs from all the endeavours aiming hitherto, at combined plants in so far as it is not, in any respect, an attempt for altering the conventional cycle of a gas turbine power plant by addition of an auxiliary steam circuit.

According to the invention, considering on the one hand a steam turbine power plant liable to supply effective power for driving a power absorbing apparatus and comprising at least two expansion stages in series, and on the other hand a constant pressure combustion gas turbine power plant liable to supply effective power for driving a power absorbing apparatus mechanically independent from the one driven by the steam turbine power plant and provided with its own regulating means specially for adjusting the temperature of the driving gas according to the load of the apparatus driven by the gas turbine, these two plants are combined by tapping off wholly or partially the exhaust gas of the gas turbine to lead it into a reheater of steam inserted between the two expansion stages of the steam turbine plant, before exhausting it through the flue.

This combination implies the use of a generator completely separated from the gas turbine, for generating steam and feeding the steam turbine plant, and of means for operating and regulating the gas turbine independently of the steam cycle. As the exhaust gas of the gas turbine is necessarily at a temperature lower than that which is detrimental to metals, the very important advantage is achieved that it is absolutely useless to control the temperature of the heating source of the steam reheater, thus doing without more or less hazardous means for measuring this temperature in order to adjust it. The steam reheater cannot anyhow be damaged and may hence be left unattended.

Figure 3:
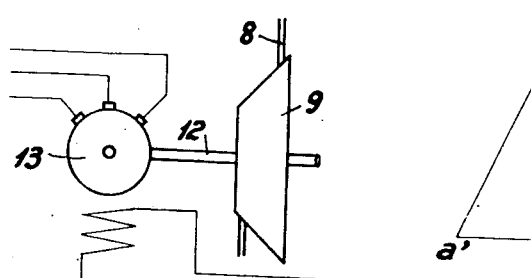
Figure 2:
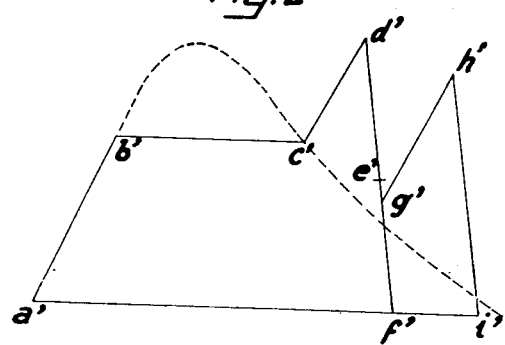

Other objects and advantages of the invention will be apparent during the course of the following description. In the accompanying drawing forming a part of this application and in which like numerals are employed to designate like parts throughout the same:

Fig. 1 is a diagram of an example of a combined plant, according to the invention, applied to the propulsion of a ship, Fig. 2 is an entropy-temperature diagram of the operation of this plant, and Fig. 3 shows another example of a plant, according to the invention, applied to an electric power-house.

In Fig. 1, 1 indicates a steam generator of any type heated by its own furnace 2 wherein any fuel is burnt (coal, fuel-oil, etc. . . .). Steam produced by this generator is led, through a conventional regulator 3, into the high-pressure steam turbine 4 wherein it performs a first expansion. It flows out of turbine 4 through a pipe 5 for being introduced into the tube nest 6 (diagrammatically shown as a coil) of a reheater 7. After this reheating, it is sucked through pipe 8 into the low-pressure steam turbine 9 wherein it proceeds with its expansion. It finally exhausts through 10 into the condenser 11 from which the condensed water may be recovered as usual for feeding generator 1. The rotors of the steam turbines 4 and 9 assumed to be keyed to the same shaft 12, drive a power absorbing apparatus 13.

Besides this steam power plant, an open circuit and constant pressure combustion gas turbine power plant is arranged. This plant comprises an air-compressor 14 sucking in atmospheric air through 15 and discharging this air through duct 16 into the combustion chamber 17. In this chamber, a burner 18 is fitted which enables to burn within the air, a liquid fuel supplied through valve 19. The mixture of air and fuel gas at high temperature is fed, through duct 20, to the gas turbine 21. The latter drives, through its shaft 22 which is mechanically independent from the shaft 12 of the steam turbines, the air-compressor 14 and a power absorbing apparatus 23.

The exhaust gas of the turbine issuing through pipe 24 is partially tapped by pipe 27 and led to the reheater 7 wherein its residual heat is used for reheating steam before the latter flows into the low-pressure steam turbine 9. The gas issuing from reheater 7 is finally led to the flue 26, as well as that having crossed the conventional recuperator 25 wherein it has transferred its heat to air discharged by compressor 14.

The above described example stresses one of the advantages of the invention. The set formed by the gas turbine and the reheater 7 may be considered as a superheater of steam having a separate furnace constituted by the combustion chamber 17. But just as it is convenient to place a back-pressure steam turbine ahead of a steam heating plant for generating mechanical or electrical energy with a theoretical efficiency of 100%, similarly it is convenient to use, according to the invention, available heat at relatively high temperature carried by the gas generated in the combustion chamber 17 to produce, by means of the gas turbine 21 and the power absorbing apparatus 23, mechanical or electrical energy with a high thermal efficiency, before using the remainder of the heat of the gas in the steam reheater 7.

The example described also stresses a further advantage of the invention. It is well known that gas fed to a gas turbine cannot have a temperature greater than a critical point which is taken nowadays as about 800° C. and above which the moving blades of the first wheel of the gas turbine would be damaged and destroyed. In the gas turbine set, conventional precautions are therefore taken to limit the temperature of the gas. Thus the air-compressor 14 discharges air in excess relatively to the amount of air which would be strictly necessary for burning fuel fed to chamber 17. The gas turbine is anyway provided with a load regulator 28 which, in the case of a rise in temperature upsetting the power equilibrium between the turbine and the power absorbing apparatus, shuts the valve 19 located on the fuel inlet to burner 18. This regulator 28 ensures accordance of the operating rate of the turbine with the load of the power absorbing apparatus 23 and hence enables to achieve an allowable temperature for the various operating conditions for which the gas turbine plant has been designed.

The result of the above matter is that the gas exhausting through 24 from the gas turbine and flowing into the steam reheater 7 has necessarily a reduced temperature and that the danger of excessive superheating of steam and damaging of the reheater, even if the steam flow is decreased or shut off, is avoided.

In order to distribute the exhaust gas between the recuperator 25 and the reheater 7, it is further possible to use an adjusting member such as a stop-valve 29 which may be connected to a thermostat 30 arranged at the outlet of the nest 6 and causing said stop-valve 29 to close when the gas flow is excessive relatively to the flow of steam to be reheated in 7.

From another standpoint, it may be considered that the invention enables to add to the normal cycle of the steam engine illustrated by curve $a'$ $b'$ $c'$ $d'$ $e'$ $f'$ $a'$ on the entropic diagram of Fig. 2, on the one hand, the cycle of the gas turbine which is excellent owing to the fact that the heat remaining in the exhaust gas is not wasted and, on the other hand, the cycle $f'$ $g'$ $h'$ $i'$ $f'$ also illustrated in Fig. 2, which is a cycle approximating Carnot cycle and which uses with very high efficiency the heat available in the exhaust gas of the gas turbine.

The benefit of such a combination may be particularly apparent if the engineer who makes it, is free to distribute most judiciously the total power to be absorbed by separate apparatus, between the steam turbines on the one hand and the gas turbine or turbines on the other hand. But even if it is not so, a part of the benefit may be forsaken for the purpose of merely solving the often delicate problem of adjusting the load or the fuel supply of the gas turbine plant.

The invention is suited to very important practical achievements.

Thus in the case of Fig. 1, a power plant applied to a ship, has been considered. The power absorbing apparatus 13 driven by the steam turbines, is the ship propeller or propellers. The regulator 3 for the intake of steam into turbines 4 and 9 is adjusted by hand according to the requirements of propulsion. The power absorbing apparatus 23 which is mechanically independent from the former one and driven by the gas turbine 21, is taken as the electric generator of the ship. The requirements of electric distribution being completely independent from propulsion, the gas turbine set may operate at constant speed. The temperature in the combustion chamber 17 and hence also the temperature of gas at the outlet 24 of the turbine and at the inlet of reheater 7, vary little when the load varies. The regulation of the gas turbine set may then be of conventional type for this kind of engine and will comprise, for instance, a common governor device responsive to the speed of revolution of the set, and controlling the fuel supply to the combustion chamber; this form of regulation is diagrammatically illustrated in Fig. 1 by a centrifugal governor 28 controlling the fuel inlet valve 19.

The reheater or heat-exchanger 7 is preferably made of steel liable to stand without creep or corrosion the temperature of the exhaust gas which runs no danger of being too high even in the case of shutting off steam when manoeuvring. Even if the temperature of steam at the intake of turbine 9 reaches the temperature of the exhaust gas of the gas turbine, it is not detrimental to expansion in the steam turbine since, as stated above, the temperature of the exhaust gas is limited.

In a further practical application (Fig. 3), the power absorbing apparatus 13 driven by the steam turbines, is an alternator of electrical powerhouse. The power absorbing apparatus 23 which is mechanically independent from the alternator and driven by the gas turbine 21, may then be the dynamo supplying direct current for energizing the alternator.

The steam turbine 9 driving the power absorbing apparatus 13 will comprise the conventional regulation device. In the example shown concerning an alternator 13 energized by a dynamo 23 driven by the gas turbine an automatic voltage regulator for instance will control the energizing current of alternator 13 for adjusting, in the known way, the voltage at its terminals.

What I claim is:

1. In a combined gas and steam power plant, a steam turbine power plant for driving an external load, said steam power plant including a steam generator and two steam turbine stages connected in series through piping means, a device for reheating steam between said turbine stages and including a hot gas line in heat exchange relationship to said piping means, a gas turbine the exhaust of which is connected to said gas line, a constant pressure combustion chamber adapted to supply hot motive gas to said gas turbine and operating independently of said steam generator, an air compressor discharging into said combustion chamber, and a second external load mechanically independent of said first mentioned load and operatively connected to said gas turbine.

2. In a combined gas and steam power plant, a steam turbine power plant for driving an external load, said steam power plant including a steam generator and two steam turbine stages connected in series through piping means, a device for reheating steam between said turbine stages and including a hot gas line in heat exchange relationship to said piping means, a gas turbine the exhaust of which is connected to said gas line, a constant pressure combustion chamber adapted to supply hot motive gas to said gas turbine and operating independently of said steam generator, an air compressor discharging into said combustion chamber, a recuperator having an air line connected to the discharge end of said compressor and the air inlet of said combustion chamber, a gas line in heat exchange relationship to said air line and connected to the exhaust of said gas turbine, distributing means for adjusting the relative flow of exhaust gas toward the reheater and the recuperator, and temperature detecting means at the outlet end of said steam line for controlling said distributing means, and a second external load mechanically independent of said first mentioned load and operatively connected to said gas turbine.

3. A combined gas and steam power plant as set forth in claim 1 in which said first mentioned external load is a screw for propelling a ship, and said second external load is an electric generator.

4. A combined gas and steam power plant as set forth in claim 1 in which said first mentioned load is an electric generator having an independent exciting winding, and said second external load is a direct current generator for supplying exciting current to said winding.

ROBERT G. LEGENDRE.

References Cited in the file of this patent

UNITED STATES PATENTS

| Number | Name | Date |
|---|---|---|
| 1,456,652 | Rossman | May 29, 1923 |
| 1,895,377 | Collingham | Jan. 24, 1933 |
| 1,978,837 | Forsling | Oct. 30, 1934 |
| 2,012,967 | Meininghaus | Sept. 3, 1935 |
| 2,095,991 | Lysholm | Oct. 19, 1937 |
| 2,303,381 | New | Dec. 1, 1942 |
| 2,336,232 | Doran | Dec. 7, 1943 |
| 2,466,723 | Mercier | Apr. 12, 1949 |

FOREIGN PATENTS

| Number | Country | Date |
|---|---|---|
| 423,111 | Great Britain | Jan. 25, 1935 |